United States Patent
Li et al.

[11] Patent Number: 6,164,777
[45] Date of Patent: Dec. 26, 2000

[54] COLOR-IMPARTING CONTACT LENSES WITH INTERFERENCE COATING AND METHOD FOR MAKING THE SAME

[75] Inventors: Hongwen Li, Pittsford; Dominic V. Ruscio, Webster, both of N.Y.; Joseph C. Salamone, Boca Raton, Fla.

[73] Assignee: Bausch & Lomb Incorporated, Rochester, N.Y.

[21] Appl. No.: 09/212,461

[22] Filed: Dec. 16, 1998

[51] Int. Cl.$^7$ ................................................. G02C 7/04
[52] U.S. Cl. ................................................. 351/162; 351/177
[58] Field of Search ........................... 351/41, 159, 163, 351/162, 177

[56] References Cited

U.S. PATENT DOCUMENTS

| | | | |
|---|---|---|---|
| 4,447,474 | 5/1984 | Neefe | 427/164 |
| 4,536,063 | 8/1985 | Southwell | 350/395 |
| 4,669,834 | 6/1987 | Richter | 351/162 |
| 4,719,657 | 1/1988 | Bawa | 8/453 |
| 4,848,894 | 7/1989 | Buser et al. | 351/162 |
| 4,889,421 | 12/1989 | Cohen | 351/162 |
| 5,414,477 | 5/1995 | Jahnke | 351/162 |
| 5,574,517 | 11/1996 | Pang et al. | 351/44 |

FOREIGN PATENT DOCUMENTS 0 677 764  4/1995  European Pat. Off. .

*Primary Examiner*—Scott J. Sugarman
*Attorney, Agent, or Firm*—Robert B. Furr, Jr.

[57] ABSTRACT

Colored contact lenses that are colored by means of interference coatings for cosmetically enhancing or changing the color of the eyes are disclosed. In particular, the interference coating is applied to a surface of the lens material and, although transparent to the cornea and iris anatomy, so that the coating reflects pre-selected bands of the light spectrum to cosmetically change or enhance the natural color or hue of the eye.

17 Claims, 1 Drawing Sheet

COLOR-IMPARTING CONTACT LENSES WITH INTERFERENCE COATING AND METHOD FOR MAKING THE SAME

FIELD OF THE INVENTION

Colored contact lenses, which employ interference coatings to cosmetically change or enhance the color of the contact-lens wearer's eyes, are disclosed. In particular, the interference coating is applied to the surface of the lens material and, although transparent to the cornea and iris morphology, reflects pre-selected bands of the light spectrum to change the natural color or hue of the eye.

BACKGROUND OF THE INVENTION

Contact lenses have been available in many colors, for many years, in both hard, including rigid gas permeable (RGP), and soft contact lenses. Both solid-colored lenses and tinted-colored lenses have been disclosed. Such lenses may be colored by adding the colorants to the monomers used to make the lens, while the monomers are in the liquid state and before polymerization of the monomers to form the colored lens material. Solid-colored lenses typically employ pigments to color the portion of the lens covering the iris and the color masks the underlying iris pattern while the lens is worn. Of course, with such solid-colored lenses, it is usually necessary to have a transparent area over the optical zone in order for the contact-lens wearer to see at all.

Tinted contact lenses employ dyes to provide color without completely blocking the passage of light through the lens. For example, U.S. Pat. No. 4,447,474 to Neefe discloses a method of tinting specific areas of soft contact lenses by placing the dye in a dye carrier made of a porous material of the size and shape of the area to be tinted. The soft lens is placed on the dye carrier and absorbs the dye in a predetermined pattern. The acid dyes known as azo dyes may be used to practice the invention, as may the dyes known as reactive dyes and sulfur dyes. The sulfur dyes are fixed or made fast by removing the sodium sulfide that make the dye soluble. Reactive dyes require no special fixing step, only extraction of unreacted dye, as they react chemically with the lens material and are thus made permanent. The properties of dyes are well known in the art. Water-soluble dyes for tinting have been selected on the basis of their water solubility, previous FDA approval for human use, and their commercial availability as biological dyes. Care must be taken that the water-soluble dyes do not leach from the lens and stain the ocular tissue, especially during long-term contact with the eye.

A disadvantage of tinted lenses is that, although they are capable of enhancing existing eye color or changing the color of light-colored eyes, tinted lenses are not generally able to produce a fundamental color change, for example, from dark brown to light blue. Especially with darker eyes (producing a dark background to the contact lens), it is difficult to see a color change with tinted lenses. On the other hand, although opaque lenses are generally capable of causing a fundamental color change, the result tends to be an unnatural appearance unless a pattern in the opaque colorant is very artistically drawn. Moreover, a thick opaque colorant on a lens may reduce the amount of oxygen transmitted through the lens, which may be unhealthy for the cornea.

To increase the natural appearance of a colored lens, iris-patterns have been made. See, for example, U.S. Pat. No. 4,719,657 to Bawa and U.S. Pat. No. 5414477 to Jahnke. Iris-pattern lenses can be made in various ways. For example, it is known to laminate a painted or printed iris pattern inside the lens material. A designed intermittent pattern can be generated by offset pad printing. However, current printing technology has limitations in the printing of smaller dots. They are normally in the range of at least 20 to 100 $\mu$m, which may adversely affect the comfort of the lens.

Another problem with solid or tinted lenses relates to the fact that soft contact lenses in contrast to hard or RGP lenses, are most commonly fitted with a diameter larger than that of the cornea. Thus, in order for the lens to be unnoticeable and remain natural in appearance, complicated and expensive fabrication steps such as masking are generally necessary to produce a configuration involving a colored iris and a concentric outer area that is not colored, so that the colored portion will not cover the sclera of the eye. An objectionable cosmetic effect for the wearer would occur if the margin of a tinted lens were conspicuous against the white sclera of the eye. Similarly, colorants must not bleed or leach from one area of the lens to another, nor must they leach into the tear fluid and thereby ultimately into the eye.

Thin-film technology has been used for a number of years to control the transmittance and/or reflectance of coated surfaces by means of interference coatings comprising a stack of thin dielectric films of alternating low and high refractive index. Known applications include, for example, light reflectors in lamps, prescription eyeglasses, and sunglasses. In sunglasses, such coatings have been used to provide a colored surface for aesthetic reasons and/or to enhance the chromaticity of certain colors, for example, greens when playing golf. By controlling the thickness and index of refraction of each film in a stack or array of thin films constituting a coating, one can tailor the reflective and transmissive characteristics of the coating.

Various classes of coatings exist based not only upon the materials used to form said coatings, but based upon spectral reflectance characteristics as well. For instance, reflective coatings have long been available which transmit in the infrared region and reflect all or most of the visible portion of the spectrum. In the lamp industry, such coatings are known generically as "cold mirrors". Alternately, coatings are also known which transmit the infrared portion of the spectrum and reflect only a fraction of the visible spectrum. These coatings are generically known as "color correcting cold mirror" coatings. Still other coatings, which reflect the infrared and transmit visible light, are known as "hot mirrors". They are used, for example, to coat lamp bulbs to conserve energy. Still other coatings such as Optivex® are commercially available for use in filters to reflect UV but transmit visible light. They are sometimes used for track lighting and in museums to prevent fading of the dyes or pigments used in paintings or other exhibits.

U.S. Pat. No. 5,574,517 to Pang et al. discloses the use of interference coating in a visual aid for individuals with red-green color blindness or color deficiency. The subject visual aid comprises a pair of optical elements, such as the lenses of a pair of eyeglasses, each element having an interference coating applied to one surface thereof. The stack is structured to give the optical elements a pre-selected spectral transmission curve with respect to eyeglasses. It also provides a multi-colored aesthetically pleasing reflective surface when viewed from the front. Pang et al. state that the optical elements may be corrective glass or plastic lenses mounted in a pair of spectacle frames, for example, ordinary glasses. Pang et al. mention that, alternately, such optical elements may take the form of contact lenses worn directly on the eye, subject to applicable health and safety requirements. Pang et al., however, disclose no embodiment for such a contact lens. Pang et al. also report that contact lenses previously sold as visual aids for color-deficient individuals, to be worn on their non-dominant eye, including the "X-Chrom" lens, did not achieved wide acceptance. Pang et al. state that the filters used in such lenses reportedly tended to reduce the number of colors that could be perceived and reduced the overall amount of light entering the eye, making them unacceptable for use in low lighting conditions, among other problems.

None of the cited references teach that a thin-film interference coating could be effectively and advantageously applied to a contact lens to cosmetically impart natural color or brightness to the iris when worn on the eye.

In view of the above, it would be desirable to develop a colored contact lens that, on the one hand, appears natural as worn on the eye, offering outstanding aesthetic beauty to the eye of the wearer and which, on the other hand, is potentially capable of producing a variety of color changes, including more fundamental color changes. For example, it would be desirable to develop a contact lens that not only is capable of enhancing the hue of a person's iris, but which is capable of satisfactorily changing the color of the eyes of the wearer, for example, from brown to blue. It would be an additional advantage if such lenses did not fully block the iris nor require the drawing of an artificial iris pattern, but were transparent to the morphology of the iris, thus allowing light to naturally reflect the background with relatively little attenuation of the iris. It would be still a further advantage if a colored soft lens could be made without always requiring the separation of the color-imparting portion of the lens from the outer concentric portion of the lens, without resulting in unacceptable coloring of the sclera where the lens overlaps. It would also be desirable if such a colored lens were completely safe for the wearer, possessing a color that does not bleed or leach from the lens into the eye or from one part of the lens to another and that does not prevent or excessively hinder the passage of oxygen to the cornea. It would be desirable to develop a colored contact lens with all these desirable properties and advantages that is capable of economic manufacture.

BRIEF DESCRIPTION OF THE ELEMENTS

SUMMARY OF THE INVENTION

Figure 1:
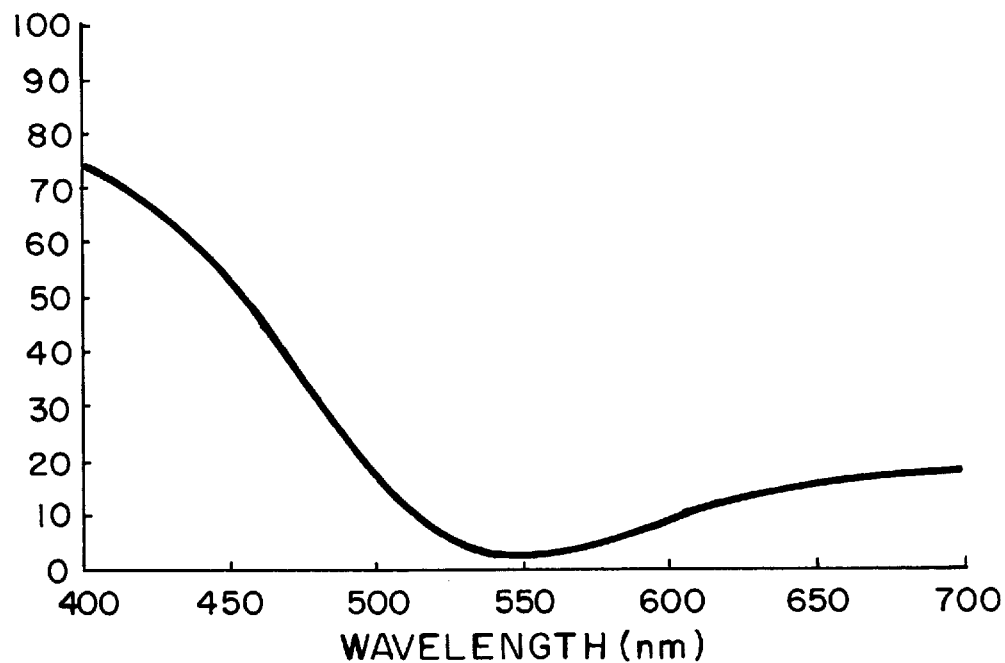
FIG. 1 shows a computed reflection curve for a contact lens designed according to the present invention, which contact lens is provided with an interference coating producing a bluish color according to the embodiment of Example 1.
Figure 2:
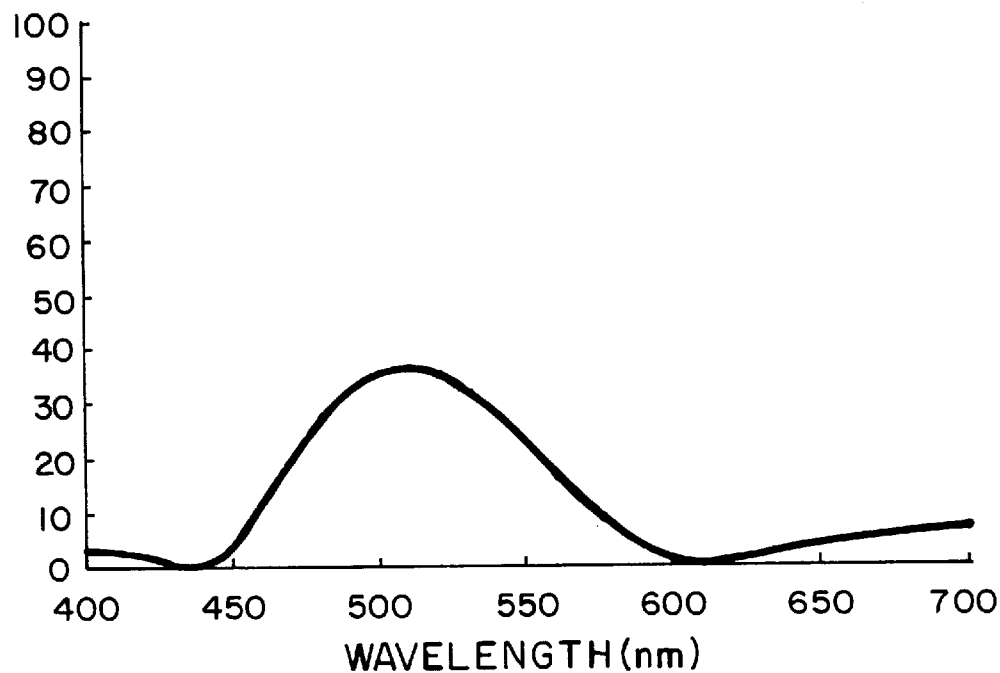
FIG. 2 shows a computed reflection curve for a contact lens designed according to the present invention, which contact lens is provided with an interference coating producing a greenish color according to embodiment of Example 2.

It has been found that contact lenses, which are coated with one or more thin optical films of different refractive indices on the portion of the lens covering the iris, can change the wearer's iris color. Such lenses can be used to make the wearer's eyes more colorful and/or bright. The coating comprises 1 to 50 layers of alternating materials, which have different refractive indices to form a filter that is designed to allow a portion of the visible light to be reflected, but at the same time to control the reflectance between 1 and 70%, preferably 2 to 50%, ,pre 5 to 30 m, so that one should be able to see through coating. The coating material could be made of any of the conventional dielectrics, for example, $TiO_2$, $Ta_2O_5$, $ZrO_2$, $Al_2O_3$, $SiO_2$, and some polymer materials. The coating can be applied on the lens surface by such techniques as vacuum evaporation, sputtering, plating or plasma enhanced chemical vapor deposition (PECVD).

DETAILED DESCRIPTION OF THE INVENTION

This invention relates to a cosmetic contact lens with a color-imparting interference coating and a process for manufacturing the same. A contact lens is coated with one or more thin optical films, which provide desired spectral reflection characteristics over the coated portion of the lens. The coating is designed and applied to affect a change in color of the wearer's eye while at the same time permitting visualization of the natural anatomy of the iris. The colored lenses produced by the invention offer a wide variety of colors with various brightness/reflectiveness as compared to the prior-art tinted or printed colored lenses.

The color lenses produced by the current invention offer a combination of advantages, including brightness (reflective), a natural appearance (the coating is semi-transparent), surface smoothness (no islands as in printing), and a variety of colors by the same process (for example, by changing the optical thickness).

The present invention is based on the discovery that thin-film coated lens capable of effecting a substantial color change of the eye may be produced by depositing thin optical films over the portion of the lens covering the iris. The color is generated by the interference effect between the substrate and the coating. The colored lenses produced by the current invention offer brightness (reflective) and natural appearance because the coating has a high level of transmission and can at least partially reveal the authentic iris pattern. The coating can be a single layer of high-refractive-index material or a multilayer which comprises a stack of alternating layers of materials with high and low refractive indices. The term "high index" denotes a refractive index of about 1.70 to 3.0, and the term "low index" denotes a refractive index of about 1.35 to 1.70, employing materials that are generally known in the art. The materials for high index layer are typically metal oxides, sulfides, and conventionally known aromatic, halogen (non-fluoro)-substituted and sulfur-containing polymers. For example, such materials include $TiO_2$, $Ta_2O_5$, $ZrO_2$, $Al_2O_3$ and ZnS. The low index materials include, for example, $SiO_2$ and most polymers. The thickness of each layer is determined by a computed optical design, as will be readily understood by the skilled artisan in the field of thin-film coatings. The number of layers and thickness of each layer determine the color and color density. As an example, the coating may be comprised of a stack of alternating layers composed of titanium dioxide ($TiO_2$) and silicon dioxide ($SiO_2$). The thickness of each of the individual layers are generally about 20 to 250 nm (nanometers), and the individual layers may be deposited by methods known in the art, such as physical vapor deposition (evaporation or sputtering) or chemical vapor deposition.

The present invention can be better understood by reference to the computed reflection/transmission curve of a lens with interference coating according to the invention. For example, a coating for blue eyes may have a reflectance curve that extends from 300 nm to 600 nm in the UV and visible wavelength region, as shown in FIG. 1. (In general, wavelengths of less than 400 nm are in the ultraviolet region (UV), from 400 to 700 are in the visible region, and 700+ are in the infrared region (IR).) In accordance with this invention, a filter to produce a blue color, for example, could be designed and manufactured wherein the array of thin films is selected to reflect light in the visible light spectrum in a wavelength region between about 400 and 500 nm.

The terms "region" or "spectrum", as used herein, are used interchangeably throughout this specification, to denote any continuous wavelength range of the electromagnetic spectrum spanned by two distinct wavelengths.

The present invention therefore utilizes a thin-film array that rejects the light in certain wavelength regions when it hits the coated lens. A typical filter to reject that light is a mirror or light filter specifically built for the regions that affect the color. For the bluish color shown in FIG. 1, for example, the array of thin films should be designed such that the light incident on the array of thin films in the region between 400 and 500 nm is reflected by the array of thin films. However, not all light should be reflected. The reflectance should be between 5 and 70 percent, preferably between 10 and 50 percent. Suitably, at least about 30 percent of the light incident on the array of thin films in the region between 400 and 500 nm is not reflected by the array of thin films, preferably at least 50%, most preferably at least 70%.

By alternating higher refractive-index materials with lower refractive-index materials, those skilled in the art can affect a reflectance or transmittance characteristic as desired by means of controlling constructive and destructive interference at various wavelengths. Typically, the layer components of the thin-film multilayer will have refractive indices between 1.35 and 3.0 and will have thickness between 10 and 1000 nm (0.01 to 1 micron). These limits are dependent upon the desired result, and upon the refractive index of not only the lower index material, but also the refractive index of the higher index material. The lower index materials, which are suitable for use in the present invention include, but are not limited to, $MgF_2$, $SiO_2$, $Na_3Al\ F_6$ (cryolite), NaF, MgO, LiF, $CeF_2$ and $Al\ F_3$.

The higher index materials are formed from various dielectrics including, but not limited to, $TiO_2$, $Ti_2O_3$ and other $Ti_xO_y$ derivatives, $Si_3N_4$, $Al_2O_3$, $PrO_2$—$TriO_2$,CdS, $CeO_2$, $Ta_2O_5$, $Si_3N_4$, ZnS, $ZrO_2$, and the like. In general, the class of "higher refractive index" materials will have refractive indices in the range of 1.70 to 3.00 as deposited.

The coatings will preferably be between 20 and 500 nm in thickness, although it is understood that the actual film thickness will be influenced by the refractive index of the material and the desired spectral characteristics of the filter. In general, the thickness of the layers can be, but are not necessarily limited to, a quarter wavelength in thickness of the wavelengths one wants to reflect the most.

The design of such films and the principles used to achieve such results are well known to those skilled in the art, as is the general knowledge of how to deposit the various thin films on various substrates. See, for example, MacLeod, H. A., *Thin-Film Optical Filters* (McGraw-Hill Publishing Co., N.Y. 1989); Thelen, Alfred, *Design of Optical Interference Coatings* (McGraw-Hill Book Co., N.Y. 1989); and Heavens, O. S., *Optical Properties of Thin Solid Films* (Dover, N.Y. 1965).

The design of each of the preferred embodiments of the invention can be determined using an iterative optimization technique in which the optical constants of the substrate and film materials are known and the desired reflectance spectrum is specified. The thickness of each layer is then found. To ensure that the filter can be conveniently and economically manufactured in commercial quantities, each layer's thickness must be within a specified tolerance of optimum thickness such that any small variations in each layer's thickness will not significantly alter the filter's reflectance curve. Those of ordinary skill in the art will be familiar with, and capable of performing such an iterative optimization operation, as a matter of routine design. The operation will typically include the steps of choosing a merit function, and then minimizing the merit function utilizing an optimization routine, to determine the optimal set of design parameters. For example, U.S. Pat. No. 4,536,063 discusses the manner in which an optical coating design merit function may be chosen and then minimized, to generate a desired optical coating design.

The present invention can be used with all contact lenses such as conventional hard, soft, rigid and soft gas permeable, and silicone (including both hydrogel and non-hydrogel) lenses. Thus, the substrate for the interference coating is the plastic or coated plastic used to make contact lenses. It has been found possible to directly coat silicone-containing materials. A binding material may be preferred on certain types of lens materials to promote adhesion.

The contact lens may be constructed of a variety conventional materials or one of the newer high Dk materials such as used for extended wear. For hard contact lenses, the traditional materials were poly(methyl methacrylate) or PMMA. Soft lenses are commonly prepared from monomers such as hydroxyethyl methacrylate, N-vinylpyrrolidone, N, N-dimethyl acrylamide, glyceryl methacrylate, methacrylic acid or acid esters and the like, siloxy monomers, fluorosiloxy monomers, or other rigid, transparent materials. Such lenses may absorb significant amounts of water such as from about 4 to about 80 percent by weight.

The present invention is useful with respect to extended wear lenses that are made from a silicone hydrogel material. Hydrogels in general are a well known class of material that comprises hydrated, crosslinked polymeric systems containing water in an equilibrium state. Silicone hydrogels generally have a water content greater than about 5 weight percent and more commonly between about 10 to about 80 weight percent. Such materials are usually prepared by polymerizing a mixture containing at least one siloxanyl-containing monomer and at least one hydrophilic monomer. Typically, either the siloxanyl-containing monomer or the hydrophilic monomer functions as a crosslinking agent (a crosslinker being defined as a monomer having multiple polymerizable functionalities) or a separate crosslinker may be employed. Applicable siloxanyl-containing monomeric units for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995. Another class of representative silicon-containing monomers includes siloxanyl-containing vinyl carbonate or vinyl carbamate monomers such as: 1,3-bis[4-vinyloxycarbonyloxy) but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris(tri-methylsiloxy)silyl] propyl vinyl carbamate; 3-[tris(trimethylsiloxy)silyl]propyl allyl carbamate; 3-[tris(trimethylsiloxy)silyl]propyl vinyl carbonate; t-butyldimethyl-siloxyethyl vinyl carbonate; trimethylsilylethyl vinyl carbonate; and trimethylsilylmethyl vinyl carbonate. Still another class of silicone-containing monomers includes polyurethane-polysiloxane macromonomers (also sometimes referred to as prepolymers), which may have hard-soft-hard blocks like traditional urethane elastomers. They may be end-capped with a hydrophilic monomer such as HEMA. Examples of such silicone urethanes are disclosed in a variety or publications, including Lai, Yu-Chin, "The Role of Bulky Polysiloxanylalkyl Methacryates in Polyurethane-Polysiloxane Hydrogels," *Journal of Applied Polymer Science*, Vol. 60, 1193–1199 (1996). PCT Published Application No. WO 96/31792 discloses examples of such monomers, which disclosure is hereby incorporated by reference it its entirety.

The thin-film materials can be deposited in a number of ways, including physical vapor deposition. Typically, a number of quarter-wave layers are successively coated on the surface of a substrate, so that layers formed of material having low refractive index alternate with layers formed of material having high refractive index. The number of quarter-wave layers (each having an optical thickness approximately equal to a desired quarter wavelength) coated on the substrate will depend on the desired optical properties of the filter for a particular color. The number of layers can suitably vary from about 1 to about 50, preferably about 1 to 9. The invention in its broadest sense is not limited to filters having any specific number of layers. The layer immediately adjacent to the substrate may be a member of the subset of materials having low refractive index or may be a member of the subset having high refractive index. In one illustrative embodiment of the invention, the substrate is glass, the even layers are composed of silicon dioxide and the odd layers are composed of titanium dioxide. However, the layers in each subset need not all have an identical refractive index. A typical procedure for producing the interference coating is as follows. The contact-lens substrate, after drying, may be placed in a vacuum chamber that is pumped down to a high vacuum ($10^{-4}$ to $10^{-6}$ Torr). Subsequently, high and low refractive index materials may be evaporated or sputtered, according to the optical design. For high quality coatings, ion-assisted deposition (IAD) or plasma enhanced chemical vapor deposition (PECVD) are preferred techniques for depositing multilayer coatings on a plastic substrate at a low temperature. The coating thickness is 0.01 to 10 $\mu$m, preferably 0.01 to 1 $\mu$m.

The interference coating may be deposited on one or both sides of the lens, on the convex (anterior) and/or concave (posterior) surface. It may also be coated on an interior surface of the lens, sandwiched between two layers of lens material, in the case of laminated lenses.

To provide for better adhesion of the interference coating, it may be desirable to provide an initial adhesion-promoting layer to the lens, especially for non-silicon containing lens materials such as HEMA-type materials. Suitable adhesion-promoting agents are polysiloxane monomers and the like which may be applied by PECVD. Also, plasma oxidation with an oxidizing gas may help to clean the surface of the lens for improved adhesion of the interference coating.

As mentioned above, the sclera-covering portion of the contact lens should be transparent or non-color imparting in order to produce a more natural appearance. In one embodiment of the invention, the reflective material is incorporated into or onto the entire contact lens, so that the entire contact lens is light reflecting. Such an interference coating is transparent and produces little or no color over a white background of the sclera. This is the most economical method of fabrication. Alternatively, the reflective material may be incorporated into or onto only that portion of the contact lens that covers the iris. This can be accomplished by conventional type of masking, for example, by placing a plastic (for example, polyethylene) or an aluminum-foil dot over the center of the lens, covering the optical zone, during deposition of the interference coating. Similarly, a mask in the shape of a concentric ring may be employed to mask that outer portion of the lens that would cover the sclera during wear. The central portion of the contact lens is preferably left completely transparent to resemble a pupil in natural appearance.

The examples presented below are provided as a further guide to the practitioner of ordinary skill in the art and are not to be construed as limiting the invention in any way.

EXAMPLE 1

A contact lens for changing the color of eyes to a bluish hue has the design shown in Table 1. The coating is designed for a lens substrate having a refractive index (n) of about 1.50 and at a design wavelength of 500 nm. The lenses were used for coating a lens made from a siloxanyl-containing high-Dk material known as Balafilcon A. (See U.S. Pat. No. 5,260,000 to Nandu and copending commonly assigned U.S. patent application Ser. No. 60/084334, filed May 5, 1998, both hereby incorporated by reference, for further description of the material treated). The processing procedure involved placing the dry lenses into a vacuum chamber, which is pumped down to $<10^{-5}$ torr and plasma enhanced chemical vapor deposition (PECVD) of an adhesion layer. The adhesion-layer deposition was at a pressure of 50 mtorr with a gas mixture of $N_2$, $O_2$ and monomer, turning the plasma on for 2 minutes. The adhesion-promoting agent was dimethyldiethoxysiloxane, commercially available from United Chemical Technologies, inc., Bristal, Pa. 19007. Deposition of a multilayer stack of $TiO_2/SiO_2$ according to the design of Table 1 was accomplished by a conventional ion-assisted evaporation process. For $TiO_2$, the pressure was $1.4 \times 10^{-4}$ with $O_2$ background. For $SiO_2$, the pressure was $1.6 \times 10^{-4}$ with $O_2$ background. The deposition temperature was 140° F.

TABLE 1

| Layer | Material | Optical Thickness |
|---|---|---|
| 1 | $TiO_2$ | 0.125 |
| 2 | $SiO_2$ | 0.25 |
| 3 | $TiO_2$ | 0.25 |
| 4 | $SiO_2$ | 0.25 |
| 5 | $TiO_2$ | 0.125 |

EXAMPLE 2

A representative contact-lens coating for providing an enhanced greenish color is shown in Table 2. The coating is designed for a lens substrate having a refractive index (n) of about 1.50 and at a design wavelength of 550 nm. The deposition process was the same as that Example 1 above.

TABLE 2

| Layer | Material | Optical Thickness |
|---|---|---|
| 1 | $TiO_2$ | 0.738 |
| 2 | $SiO_2$ | 0.593 |
| 3 | $TiO_2$ | 0.407 |
| 4 | $SiO_2$ | 0.319 |

While the invention has been described in conjunction with specific examples thereof, this is illustrative only. Accordingly, many alternatives, modifications, and variations will be apparent to those skilled in the art in light of the foregoing description and it is, therefore, intended to embrace all such alternatives, modifications, and variations as to fall within the spirit and scope of the appended claims.

We claim:

1. A contact lens comprising an interference coating for cosmetically imparting a color to the eye when the contact lens is worn, said interference coating comprising at least one thin-film material, a high index of refraction dielectric material, that is deposited upon the surface of the lens, said thin-film material and thickness selected such that a preselected spectrum of visible light is reflected from said lens so that the lens provides a color change or a color enhancement to the iris of the eye.

2. The contact lens of claim 1 wherein the interference coating comprises an array of alternating high index of refraction and low index of refraction dielectric materials deposited upon the surface of the lens, said array selected such that a desired spectrum of visible light is reflected from said lens so that the lens provides a color change or a color enhancement to the iris of the eye.

3. The contact lens of claim 1, wherein the interference coating is formed only on the portion of the lens designed to cover the iris of the eye during wear.

4. The contact lens of claim 1, wherein the lens is either a rigid-gas-permeable or a soft hydrogel lens, and the interference coating is formed on the concave surface or convex surface of the lens or on both surfaces.

5. The contact lens of claim 1, wherein the lens is a silicone hydrogel material.

6. The contact lens of claim 1, wherein the substrate is a transparent lens coated with the array of thin films on the anterior side only.

7. The contact lens of claim 2, wherein the number of layers is 1 to 50.

8. The contact lens of claim 7, wherein the number of layers is 1 to 9.

9. The contact lens of claim 1, wherein the coating is sandwiched between two layers of lens material.

10. The lens of claim 1, wherein the array of thin films is selected to reflect 5 to 50 percent of the light in the visible light spectrum in the wavelength region between about 400 and 600 nm.

11. The contact lens of claim 1, wherein the array of thin films is designed such that less than 70 percent of the light incident on the array of thin films in the region between 400 and 700 nm is reflected by the array of thin films.

12. The contact lens of claim 2, wherein the array of thin films is designed such that less than 30 percent of the energy of the light incident on the films in the region between 400 and 700 nm is reflected by the thin film.

13. The contact lens of claim 2 wherein said optical coatings array of thin films of alternating high and low index of refraction dielectric materials are alternating layers of a material selected from the group consisting of $TiO_2$ and $SiO_2$, ZnS and $MgF_2$, $TiO_2$ and $MgF_2$, and $ZrO_2$ and $SiO_2$.

14. The contact lens of claim 1 wherein the lens supports a light-reflective interference coating in a circular area covering the iris of the wearer, said area being substantially equal in diameter with the size of an iris, and wherein the lens further comprises an concentric outer area that does not support a light-reflective interference coating.

15. A method of cosmetically imparting a color to the eye when the contact lens is worn by wearing a contact lens comprising a light-reflecting interference coating comprising at least one thin-film material, a high index of refraction dielectric material, that is deposited upon the surface of the lens, said thin-film material and thickness selected such that a preselected spectrum of visible light is reflected from said lens so that the lens provides a color change or a color enhancement to the iris of the eye.

16. A method of making a cosmetic contact lens for imparting color to the eye by applying to at least a portion of one or both sides of the lens one or more thin films of dielectric material, each of the one or more thin films being either a high index or a low index dielectric material but a high index material in the case of a single thin film, the particular material and thickness of each of the one or more thin films being selected such that the coating imparts color to the iris by means of light-reflective interference when the lens is worn on the eye.

17. The method of claim 16, wherein the method comprises applying the high or low index dielectric material to a dried lens by means of ion-assisted deposition (IAD) or plasma enhanced chemical vapor deposition (PECVD) at a surrounding temperature of 20 to 75° C.

* * * * *